Oct. 2, 1934.     J. F. HIGBEE     1,975,273
DEMOUNTABLE RIM STRUCTURE
Filed Aug. 31, 1931
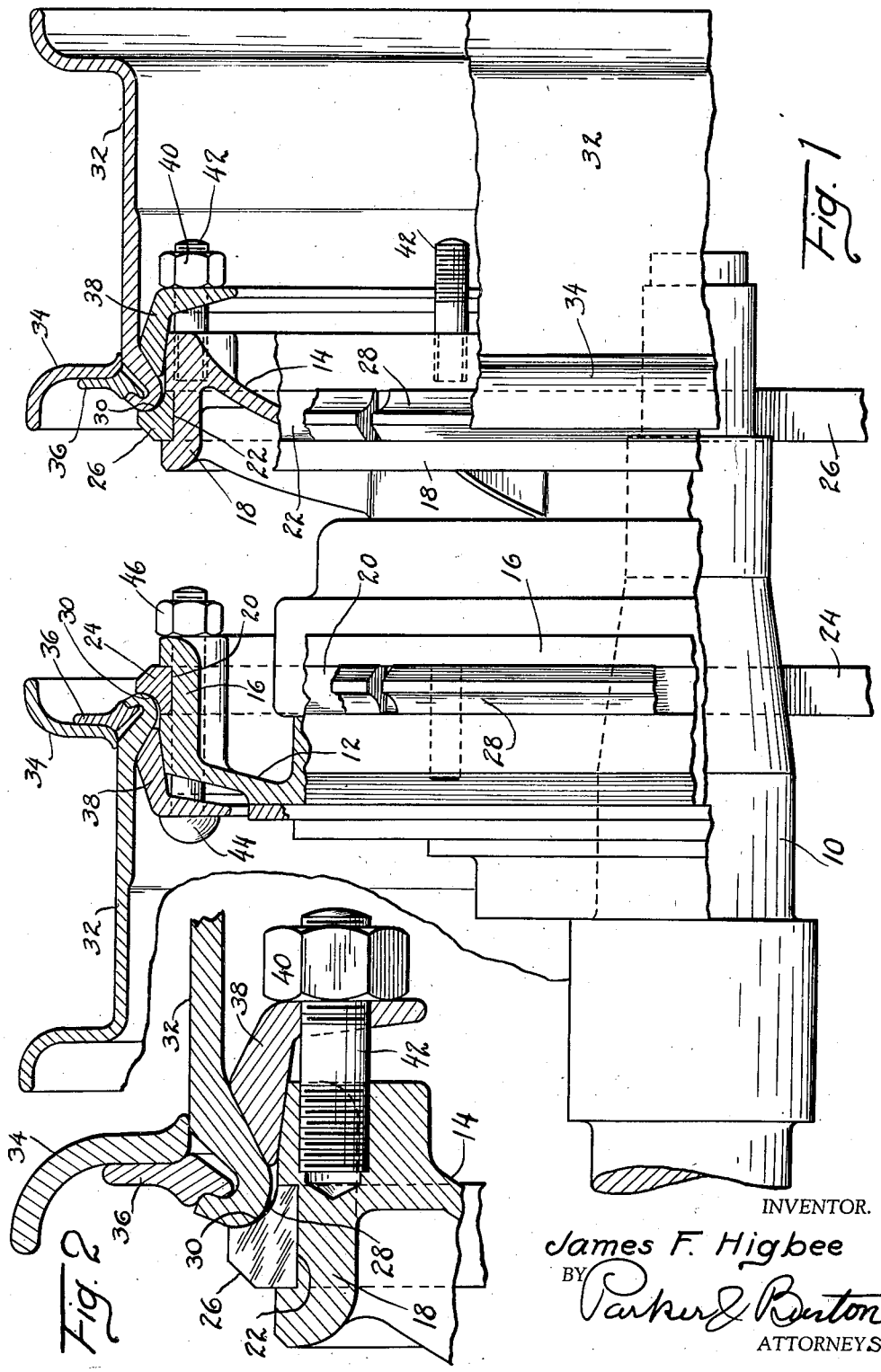
INVENTOR.
James F. Higbee
BY *Parker & Burton*
ATTORNEYS.

Patented Oct. 2, 1934

1,975,273

UNITED STATES PATENT OFFICE 1,975,273

DEMOUNTABLE RIM STRUCTURE

James F. Higbee, Detroit, Mich., assignor of one-half to Stephen A. Griggs, Detroit, Mich.

Application August 31, 1931, Serial No. 560,308

3 Claims. (Cl. 301—11)

My invention relates to vehicle wheels and has particular reference to an improved demountable rim assembly. While this invention is applicable to all wheels, it is peculiarly adapted for use in conjunction with dual wheel assemblies such as have come into quite general use on heavy trucks, trailers, buses, et cetera.

Hitherto no little difficulty has been found in changing either one or both of the tires on such dual wheel assemblies. It has usually been necessary to remove at least a portion of the outer wheel in order to secure access to the inner assembly for the purpose of removing the inner tire and rim. Furthermore, on many types of dual wheels the rim positioning means must be manipulated from a point between the wheels. Inasmuch as the wheels are usually spaced but a short distance from one another this necessity renders the job of changing tires and rims not only tedious but unnecessarily lengthy.

An object of the invention is to simplify the arrangement whereby the tire and rim is positioned upon the wheel and to so arrange the wheel elements that they are accessible and easily manipulated. As illustrated in the accompanying drawing, the bolts which secure the rim positioning means are located immediately adjacent the inner periphery of the rim and may be manipulated from the outside of both the inner and outer wheels.

A further object of the invention is to so construct and arrange the parts utilized for positioning the rim that it is possible to use a rim having a minimum inside diameter which is greater than the diameter of the wheel upon which it is supported. In this way the tire and rim assembly on the inner wheel may be readily slipped over the outer wheel after its tire and rim have been removed.

Still a further object of my invention is to so position the tire and rim upon the wheel that there can be no possibility of relative movement or slippage between the two. Instead of utilizing the wheel itself as a positioning unit for the rim, as is customary, I have provided a special snap ring which is adapted to seat in a groove formed around the peripheral face of the wheel. The face of the ring against which the rim is adapted to seat is beveled on a radius which cooperates with the edge of the rim in such a way that lateral pressure exerted by the securing means against the rim edge functions to press the ring downwardly more firmly in its seat. Furthermore, the snap ring which functions to hold the rim laterally is in turn itself held in place by the rim.

Various other meritorious features of the invention will be apparent from the following description taken in conjunction with the drawing wherein:

Fig. 1 illustrates a dual wheel assembly, partly broken away and in section, utilizing my improved rim positioning means, Fig. 2 is an enlarged section of the improved feature.

Referring now to the drawing, numeral 10 illustrates the stub of an axle upon which the wheels 12 and 14 are mounted. The method and structure involved in their mounting is immaterial so far as the invention claimed herein is concerned. It will be noted that each wheel is provided with laterally extending flanges 16 and 18, provided with grooves 20 and 22 respectively extending around the peripheral face thereof. In the dual wheel assembly illustrated it is to be noted that flanges 16 and 18 extend toward one another.

Seated in the grooves 20 and 22 are split rings 24 and 26 respectively. These rings are more accurately termed "adapter rings" because of their function of forcing or adapting the rims to a true vertical plane. Each ring is provided on that face against which the edge of the rim is to abut with a beveled arcuate face 28. This arcuate face has a radius slightly larger than the radius of the turned over edge portion 30 of the rims 32.

While the bevelled arcuate face 28 of the snap ring 26 is shown in the drawing as embodying a radius greater than that of the turned over edge portions of the rim, the important feature resides in so designing these two arcuate surfaces that only those portions thereof which lie substantially in a vertical plane are in contact with one another when the rim is tightened.

The important feature lies in providing means for limiting the lateral movement of the rim during the tightening operation with extreme accuracy. If the two arcuate surfaces were adapted to contact over any substantial horizontal portion thereof, or if the curved surfaces were adapted to lie substantially coincident with one another when finally positioned, friction between the two surfaces would seriously jeopardize proper centering of the rim on the wheel. It would be necessary to adjust one tightening bolt 40 and then another in succession to insure proper centering and eliminate the undesirable wheel wobble which results from improper centering. Where the cooperation of the surfaces is as above described, the tightening bolts may be screwed in fully successively around the circumference of the rim and the substantially vertical engaging portions of the curved cooperating surfaces will insure centering of the rim automatically without subsequent adjusting of the bolts.

The side wall 34 of each rim is retained in position in conventional manner by means of the snap ring 36. Each rim is held in position against the bevel 28 of the rings 24 and 26 by means of an annular ring 38. By utilizing an annular ring for this purpose rather than the customary lugs pressure may be exerted around the entire circumference of the rim for the purpose of retaining it firmly in place. Lugs may be utilized, however, without in any way affecting the success of the improved structure.

In the dual wheel assembly illustrated it will be noted that the ring 28 of the outer wheel is forced laterally inwardly by means of the spaced apart nuts 40 which cooperate with the fixed bolts 42. The bolts, of course, extend through apertures in the retaining ring. On the inner wheel the retaining ring is drawn in an opposite direction to that of the retaining ring of the outer wheel by means of a headed bolt 44 which is inserted through lateral apertures in the flange 16 prior to turning up the nuts 46 on the outside of the wheel assembly. It will therefore be apparent that the rim positioning means of both the inner and outer wheel may be manipulated from the outside of the respective wheels. Inasmuch as the rings 24 and 26 are seated around the outer peripheries of the wheels and extend radially therebeyond to seat the rim it is only necessary to remove the outer rim and the split rings 24 and 26 to permit sliding the inner rim 32 over both wheels.

Furthermore, as the nuts 40 and 46 are tightened the lateral pressure exerted by the rim positioning rings 38 is transmitted through the turned over edge of the rim and, by virtue of the beveled portion of the split rings 24 and 26, a component of this force is directed downwardly upon the rings 24 and 26 to seat them firmly in their respective grooves 20 and 22. In this way all possibility of rings 24 and 26 being jarred from their proper position, or loosened by reason of poor tempering in the metal is eliminated.

Having illustrated a preferred form of my invention various modifications will be apparent to those skilled in the art and for that reason I intend to limit myself only within the scope of the appended claims.

What I claim is:

1. A wheel and rim assembly including, in combination, a wheel body, a groove extending around the peripheral surface thereof, a split ring seated in said groove and provided with an arcuate beveled face having a portion of said arcuate face extending substantially in a vertical direction, a wheel rim having a circumferential portion extending radially inwardly and turned over on a radius less than the arc of said bevel at its edge to seat upon the bevel, a wedge ring associated with said wheel body and positioned between the rim and the wheel body to sustain all the load on the wheel, said wedge ring adapted to draw the turned over portion of the rim laterally up against the substantially vertical portion of said bevel whereby the split ring receives only the lateral thrusts of the wheel.

2. A wheel and rim assembly including, in combination, a wheel body, a wheel rim mounted about said body, a wedge shaped depending portion on said rim, an adjustable wedge ring interposed between said rim and wheel body engaging with said wedge shaped depending portion and adapted to transmit all the radial loads imposed upon the rim, a groove extending around the peripheral face of said wheel body, a split ring seated in said groove and provided with an arcuate bevel having a portion thereof extending in a substantially vertical direction, said wedge shaped depending portion of the rim contacting said bevel and adapted to be drawn up laterally against the substantially vertical portion thereof upon adjustment of said wedge ring whereby the split ring sustains only lateral thrusts of the wheel.

3. A wheel and rim assembly including, in combination, a wheel body, a wheel rim mounted about said body provided with an internally extending rounded portion, adjustable wedging means interposed between said rim and wheel body and engageable with said rounded portion of the rim to sustain radial loads imposed upon the rim, a split ring carried by said wheel body provided with an arcuate beveled face having a portion of this beveled face extending substantially in a vertical direction, said rounded portion of the rim adapted to contact said beveled face of the ring and further adapted upon adjustment of said wedging means to be drawn up laterally against the substantially vertical extending portion of the beveled face whereby the split ring sustains only lateral thrusts of the wheel.

JAMES F. HIGBEE.